United States Patent [19]

Zielke et al.

[11] 4,257,914

[45] Mar. 24, 1981

[54] METHOD FOR THE REGENERATION OF SPENT MOLTEN ZINC CHLORIDE

[75] Inventors: Clyde W. Zielke, McMurray; William A. Rosenhoover, Pittsburgh, both of Pa.

[73] Assignees: Conoco, Inc., Stamford, Conn.; The United States of America as represented by the United States Department of Energy, Washington, D.C.

[21] Appl. No.: 102,164

[22] Filed: Dec. 10, 1979

[51] Int. Cl.³ .................. B01J 27/32; B01J 35/12; C10G 1/06; C01B 9/00

[52] U.S. Cl. .......................... 252/415; 203/41; 208/10; 208/108; 252/417; 423/107; 423/491

[58] Field of Search ............ 252/415, 417, 411 R, 252/420; 423/107, 491; 203/41; 208/10, 108; 75/86, 87; 55/71, 74

[56] References Cited

U.S. PATENT DOCUMENTS

| 3,388,993 | 6/1968 | Peterson et al. | 55/71 |
|---|---|---|---|
| 3,594,329 | 7/1971 | Gorin et al. | 252/417 |
| 3,667,934 | 6/1972 | Derham et al. | 75/86 |
| 4,081,400 | 3/1978 | Gorin | 252/415 |
| 4,162,963 | 7/1979 | Gorin | 252/415 |
| 4,182,747 | 1/1980 | Gravey | 252/411 R |

*Primary Examiner*—P. E. Konopka
*Attorney, Agent, or Firm*—F. Lindsey Scott; William A. Mikesell, Jr.

[57] ABSTRACT

In a process for regenerating spent molten zinc chloride which has been used in the hydrocracking of coal or ash-containing polynuclear aromatic hydrocarbonaceous materials derived therefrom and which contains zinc chloride, zinc oxide, zinc oxide complexes and ash-containing carbonaceous residue, by incinerating the spent molten zinc chloride to vaporize the zinc chloride for subsequent condensation to produce a purified molten zinc chloride: an improvement comprising the use of clay in the incineration zone to suppress the vaporization of metals other than zinc. Optionally water is used in conjunction with the clay to further suppress the vaporization of metals other than zinc.

9 Claims, 1 Drawing Figure

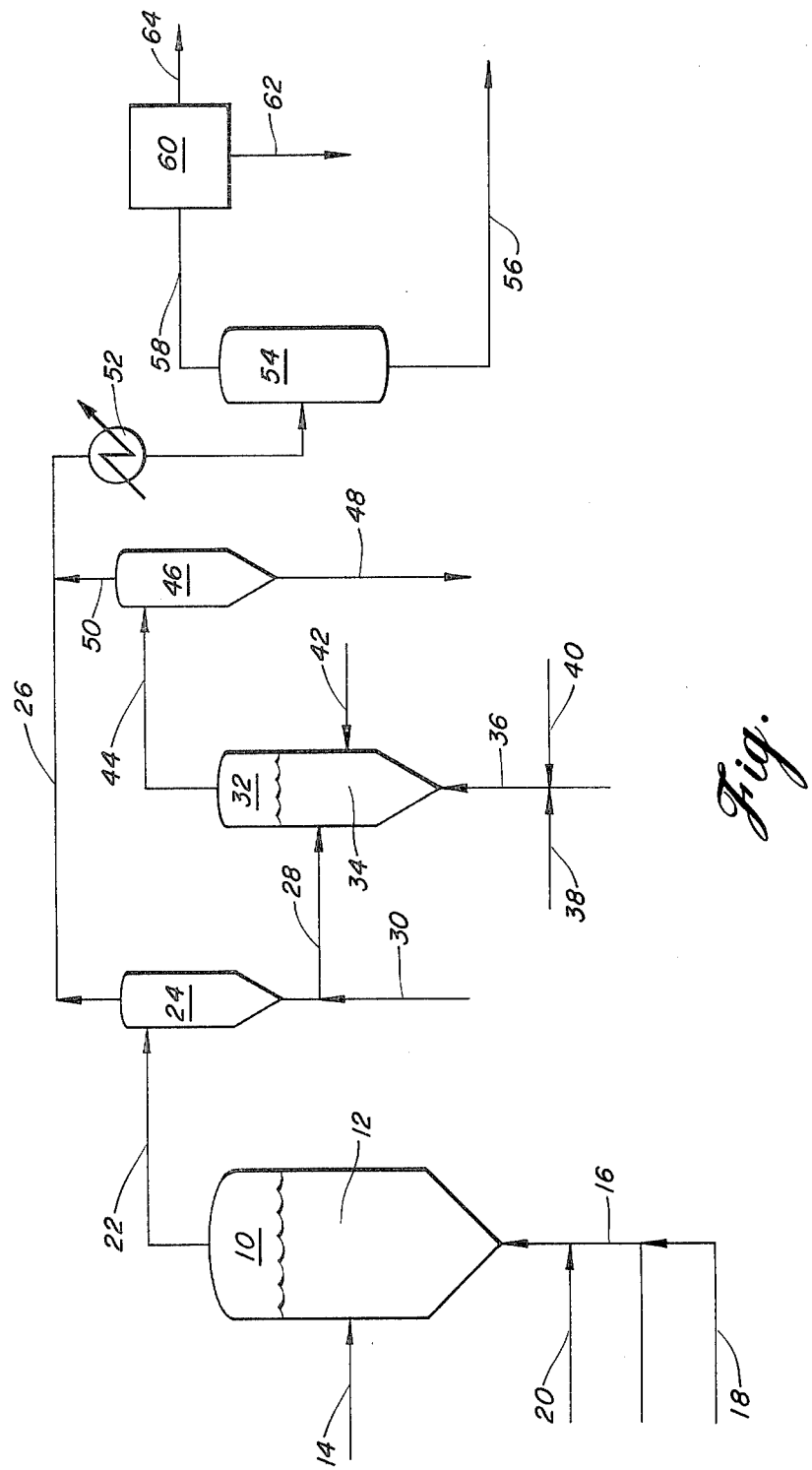

METHOD FOR THE REGENERATION OF SPENT MOLTEN ZINC CHLORIDE

This invention resulted from work done pursuant to a contract with the U.S. Department of Energy (Contract No. EX-76-C-01-1743).

This invention relates to the regeneration of spent molten zinc chloride which has been used in the hydrocracking of coal or ash containing polynuclear aromatic hydrocarbonaceous materials derived therefrom.

In recent years a considerable amount of effort has been directed to the development of processes which will produce synthetic natural gas, liquid hydrocarbon fuels, such as gasoline, fuel oil and the like from nonpetroliferous feedstocks. As is well-known the use of petroleum is growing increasingly expensive and the supplies of petroleum appear to be limited. Accordingly, it is highly desirable that methods be found to use more abundantly available feedstocks, such as coal of various grades. A considerable amount of effort has been directed to the development of a process whereby coal, coal extract or the like is mixed with molten zinc chloride in the presence of hydrogen to produce lighter hydrocarbonaceous fuels. Some such processes are shown in various U.S. Pat. Nos. such as:

| Patent No. | Issue Date | Inventor |
|---|---|---|
| 3,355,376 | 11/28/67 | Gorin et al. |
| 3,371,049 | 2/27/68 | Gorin et al. |
| 3,594,329 | 7/20/71 | Gorin et al. |
| 3,625,861 | 12/7/71 | Gorin et al. |
| 3,629,159 | 12/21/71 | Gorin et al. |
| 3,708,270 | 1/2/73 | Birk et al. |
| 3,728,252 | 4/17/73 | Pitchford |
| 3,736,250 | 5/29/73 | Berg et al. |
| 3,764,515 | 10/9/73 | Kiovsky |
| 3,790,468 | 2/5/74 | Loth |
| 3,790,469 | 2/5/74 | Loth et al. |
| 3,844,928 | 10/29/74 | Geymer |
| 3,998,607 | 12/21/76 | Wesselhoft et al. |
| 4,081,400 | 3/28/78 | Gorin |
| 4,120,668 | 10/17/78 | Fraley |
| 4,132,628 | 1/2/79 | Pell |
| 4,134,826 | 1/16/79 | Gorin |
| 4,136,056 | 1/23/79 | Zielke |

These patents were considered in the preparation of this application and are hereby incorporated by reference.

Further, an article entitled "How to Burn Salty Sludges," by Wall, Graves and Roberts, Chemical Engineering, April, 14, 1975, pp. 77–82, was considered in the preparation of this application. This article is also incorporated in its entirety by reference.

In the use of such processes it is necessary that the zinc chloride used to catalyze the reaction be regenerated since large amounts of zinc chloride are used relative to the amount of coal feedstock charged. For instance, amounts of zinc chloride equal to the coal feedstock charged may be used. Clearly, it is necessary that some method be available for regenerating the zinc chloride for reuse in the process. A variety of methods for regenerating the zinc chloride are discussed in the patents listed above with a preferred method being the use of an incineration technique. Such a process is described in some detail in U.S. Pat. No. 3,594,329 and in U.S. Pat. No. 4,081,400. In the use of such processes a continuing concern is the buildup of other volatile metal constituents in the zinc chloride since other metals or metal salts which are volatile at the same conditions as the zinc chloride may be vaporized, condensed and recycled with the zinc chloride. Accordingly, a continuing effort has been directed to the development of methods whereby the recovery of undesired metals and metal salts with the zinc chloride may be avoided.

It has now been found that the vaporization of metals and metal salts other than zinc chloride is suppressed by the use of a finely-divided clay in the incineration zone. Further, it has been found that the vaporization of metals and metal compounds, other than zinc chloride is further suppressed by the use of water in combination with the finely-divided clay.

The FIGURE is a schematic diagram of an embodiment of the process of the present invention.

In the FIGURE a primary regenerator 10 containing a fluidized bed 12 is shown. Fluidized bed 12 may comprise any suitable refractory inert finely-divided solid. Some suitable materials, as set forth in U.S. Pat. No. 3,594,329, are silica sand, alpha alumina, aluminum silicates, mullite, zinc oxide and the like. The fluidized bed comprises an inert bed of finely-divided solids in which the vaporization of the molten zinc chloride occurs. The spent molten zinc chloride is charged to primary regenerator 10 via a line 14 with air being charged to the lower portion of fluidized bed 12 through a line 16. Hydrogen chloride is added to line 16 via a line 20 to provide a mixture of air and hydrogen chloride to primary regenerator 10. Clay is added to primary regenerator 10 via a line 18. The spent melt charged to primary regenerator 10 desirably has a carbon content from about 3 weight percent to about 6 weight percent. When the amount of carbon contained in the spent melt stream is less than about 3 weight percent it is difficult to maintain the temperature in primary regenerator 10 without the addition of extraneous fuel and when amounts of carbon greater than about 6 weight percent are present, it is difficult to control the temperature in primary regenerator 10 without the use of heat exchangers and the like. In any event, the carbonaceous material is burned in fluidized bed 12 to produce a gaseous stream which is recovered through a line 22 from primary regenerator 10 and passed to a cyclone or other gas-solids separator 24 where a gaseous stream is recovered via a line 26 and passed to further processing with a solids stream comprising zinc oxide, zinc oxide complexes, ash constituents and the like being recovered through a line 28 and passed to a secondary regenerator 32 which includes a fluidized bed 34. The fluidized bed in secondary regenerator 32 may be of the same materials used in primary regenerator 10. The operation of secondary regenerator 32 is similar to the operation of primary regenerator 10 except that the use of an additional fuel is normally required. The addition of such fuel is shown via a line 42. The fuel may be selected from commonly used fuels such as hydrocarbonaceous liquids or gases or fuels such as coal, char or the like may be used. Air is injected into secondary regenerator 32 via a line 36 and normally contains hydrogen chloride which is added to line 36 via a line 38. Optionally clay and water are charged to secondary regenerator 32 via a line 30 and a line 40 respectively. The resulting gaseous mixture recovered from secondary regenerator 32 via a line 44 is passed to a cyclone or other gas-solids separator 46 from which a solids stream 48 is recovered and passed to waste with a gaseous stream being recovered via a line 50 and passed to line 26 where it is combined with the vaporous stream flowing through line 26 and passed through a condenser 52 to a separator 54 where the condensed molten zinc chloride is recovered via a line 56 and recycled to the coal conversion process with a stack gas stream being recovered via a line 58 and passed to an HCl scrubbing zone 60 from which an HCl stream is recovered via a line 62 with a scrubbed stack gas being vented via a line 64.

In the practice of the process of the present invention, finely-divided clays as defined in the *Condensed Chemical Dictionary*, Ninth Edition, 1977, Van Nostrand Reinhold Company, 450 West 33rd Street, New York, NY 10001, P. 212 are suitable.

Most clays, i.e. aluminum silicates, are suitable when finely divided if they are suitably reactive at the incineration conditions. The clays are desirably selected from those which do not contain substantial quantities of metals, such as kaolinites, halloysites, smectites and the like. As known to those in the art a number of clays of each type are known. The kaolin clays are preferred since they contain relatively small quantities of metals such as potassium, sodium. calcium, iron, etc. The clay is desirably added to primary regeneration zone 10 via line 18 in an amount sufficient to suppress the vaporization of metals and metal constituents other than zinc chloride. The amount of clay to be used can be determined by simply analyzing the vaporous stream flowing through line 22 and determining the amount of clay beyond which further clay additions result in no further or a minimal decrease in the amount of metals or metal constituents other than zinc chloride contained in stream 22. Clearly the stream flowing through line 26 could also or alternatively be analyzed to determine whether the vaporization of metals other than zinc has been suppressed. In most instances it is expected that the amounts of clay used will be less than about 100 weight percent based upon the amount of ash charged to primary regenerator 10 and in many instances it is expected that amounts of clay up to about 25 weight percent will be sufficient.

The vaporization of metals and metal constituents other than zinc chloride in primary regenerator 10 and in secondary regenerator 32 may be further suppressed by the addition of water. The water has been found to act in combination with the clay to suppress the vaporization of certain metal constituents. The amounts of water used are desirably selected so that the water concentration is less than about 10 mol percent in the stream leaving primary regenerator 10 via line 22 and in the stream leaving secondary regenerator 32 via line 44. It is undesirable that excessive amounts of water be used since the use of quantities of water in excess of about 10 mol percent will begin to result in the production of increased quantities of zinc oxide in line 28 and eventually in line 48. The use of excessive amounts of water is detrimental since it is undesirable that zinc be lost from the process. Clearly, it will be necessary to determine the amount of water to be used based upon the amount of suppression of undesired metal constituents desired as opposed to the amount of zinc lost to zinc oxide as a result of the use of the water. In most instances, it is expected that no water addition to primary incinerator 10 will be necessary since water is a byproduct of the combustion process.

Further, in regenerator 10 the use of clays may be very beneficial in maintaining fluidity of fluidized bed 12 when constituents which tend to liquify at the incineration conditions are present. Such aspects of the use of clays are discussed in the article "How to Burn Salty Sludges", referenced above. Normally, first regenerator 10 operates at a temperature from about 1600° to about 2100° F. and desirably at a temperature from about 1700° to about 1800° F. so that in some instances constituents which may tend to form tacky or liquid compounds may be present. The formation of such compounds is inhibited by the use of clays. It is normally unnecessary to add water to first regenerator 10 even when clays are used since the combustion of the carbonaceous constituents of the spent melt normally results in the presence of enough water to assist in the suppression of the undesired components.

Optionally, clay may be added to secondary regenerator 32 via line 30 to suppress the vaporization of undesired metals and metal constituents from regenerator 32 via line 44. The quantities added are similar to that added to primary regenerator 10, i.e. up to about 100 weight percent based upon the amount of ash charged, but typically less than about 25 weight percent. It will normally be necessary to add some water to regenerator 32 to supply the amounts desirable to assist in suppressing the vaporization of metals other than zinc.

The same limitations on the use of water as apply to the use of water in regenerator 10 apply to the use of water in regenerator 32, since the use of excessive water in secondary regenerator 32 may result in the loss of zinc values as zinc oxide via line 48.

The processes which produce the spent zinc chloride have not been discussed in detail since these processes are described in considerable detail in the reference incorporated herein. The substantially solids free zinc chloride recovered through line 56 is recycled to the process and the HCl recovered via line 62 is also desirably recycled to the process since HCl is added through line 20 and line 38 to the process. The metallic constituents contained in the coal ash may vary widely, but normally will comprise sodium, potassium, calcium, magnesium, iron, titanium, aluminum, silica and their compounds such as oxides, chlorides, silicates and the like. The vaporization of such materials and their compounds has been found to be suppressed under the incineration conditions by the use of clays as described above as shown in the following example.

EXAMPLE

Tests demonstrating the present invention were conducted by placing quantities of ash samples containing zinc compounds and other metallic constituents in a porcelain boat wherein the solids were exposed to a gas flow of the composition shown at a gas flow velocity of about 0.05 ft/sec at a temperature of about 1038° C. and atmospheric pressure. The solids were exposed in a thin layer of about 1/16 inch in depth. The ash solids analysis in weight percent was as follows: total zinc, 7.48; water soluble zinc, 2.94; water insoluble zinc (by difference), 4.54; total $C_2$, 4.92; hydrogen, 0.08; carbon, 0.09; sulfur, 0.37; $Na_2O$, 0.101; $K_2O$, 0.028; CaO, 11.40; MgO, 4.45; $Fe_2O_3$, 3.90; $TiO_2$, 0.94; $SiO_2$, 42.86; and $Al_2O_3$, 18.41. The porcelain boat was heated prior to charging the ash to the boat to a temperature approximately 27° C. higher than the reaction conditions to minimize changes in the weight of the boat. The clay used was kaolin. The test results are shown below in Table I.

TABLE

| Feed |
|---|

TABLE-continued

| | | | | | | | | | | | | | |
|---|---|---|---|---|---|---|---|---|---|---|---|---|---|
| Ash Wt. % | 100 | 100 | 100 | 50 | 50 | 100 | 100 | 50 | 50 | 92.4 | 92.4 | 48.05 | 48.05 |
| Clay Wt. % | — | — | — | 50 | 50 | — | — | 50 | 50 | — | — | 48.05 | 48.05 |
| NaCl Wt. % | — | — | — | — | — | — | — | — | — | 7.6 | 7.6 | 3.9 | 3.9 |
| Inlet Gas Composition, Mol % | | | | | | | | | | | | | |
| Anhydrous HCl | 10 | 10 | 8.6 | 10 | 8.6 | 10 | 8.2 | 10 | 8.2 | 10 | 8.2 | 10 | 8.2 |
| Air | 90 | 90 | 77.6 | 90 | 77.6 | 90 | 73.8 | 90 | 73.8 | 90 | 73.8 | 90 | 73.8 |
| $H_2O$ | 0 | 0 | 13.8 | 0 | 13.8 | 0 | 18.0 | 0 | 18.0 | 0 | 18.0 | 0 | 18.0 |
| Gas Temp., °C. | 54.4 | 54.4 | 54.4(1) | 54.4 | 54.4(1) | 54.4 | 60(2) | 60 | 60(2) | 60 | 60(2) | 60 | 60(2) |
| Time of Gas Flow, Min. | 60 | 60 | 60 | 60 | 60 | 30 | 30 | 30 | 30 | 30 | 30 | 30 | 30 |
| Effluent Ash, % of Feed Ash | 83.20 | 83.80 | 84.83 | 85.13 | 86.91 | 83.75 | 85.03 | 86.19 | 83.98 | 77.72 | 81.07 | 85.51 | 85.01 |
| % Total Zinc in Effluent Ash | 0.72 | 0.93 | 0.96 | 0.49 | 0.70 | 1.25 | 1.35 | 0.73 | 0.93 | 0.81 | 1.02 | 0.80 | 1.05 |
| % Total Zinc Removed From Feed | 92.6 | 89.71 | 89.21 | 88.98 | 84.13 | 85.95 | 84.77 | 83.59 | 80.31 | 91.95 | 89.69 | 80.87 | 75.42 |
| % $H_2O$-Insoluble Feed Zinc Removed | 86.93 | 83.11 | 82.19 | 81.82 | 73.68 | 76.87 | 74.83 | 72.73 | 67.53 | 86.71 | 83.02 | 68.57 | 59.72 |
| % $Fe_2O_3$ in Effluent Ash | 3.18 | 3.00 | 3.86 | 2.75 | 2.43 | 3.12 | 4.34 | 2.82 | 2.99 | 3.26 | 4.43 | 2.46 | 2.65 |
| % Fe Removed from Feed | 32.06 | 35.43 | 16.00 | 4.94 | 15.00 | 34.11 | 1.35 | 1.23 | 0.00 | 27.19 | 0.00 | 6.85 | 1.32 |
| % $Na_2O$ in Effluent Ash | — | — | — | — | — | — | — | — | — | 0.35 | 2.44 | 1.23 | 1.81 |
| % Na Removed from Feed | — | — | — | — | — | — | — | — | — | 94.04 | 57.24 | 47.69 | 23.88 |
| % CaO in Effluent Ash | 11.19 | 11.73 | 12.20 | 6.31 | 6.25 | 11.83 | 12.11 | 5.92 | 6.80 | 11.96 | 12.09 | 5.50 | 5.73 |
| % Ca Removed from Feed | 18.23 | 13.75 | 9.54 | 0.00 | 0.00 | 13.01 | 9.74 | 5.11 | 0.00 | 11.66 | 6.69 | 4.40 | 1.22 |
| % MgO in Effluent Ash | 5.19 | 7.21 | 5.51 | 2.66 | 2.35 | 5.68 | 5.12 | 2.39 | 2.56 | 4.90 | 4.97 | 2.79 | 2.73 |
| % Mg Removed from Feed | 2.67 | 0.00 | 0.00 | 0.00 | 5.71 | 0.00 | 2.03 | 4.23 | 0.00 | 0.00 | 0.00 | 0.00 | 1.28 |

While the present invention has been described by reference to its preferred embodiments, the embodiments shown are illustrative rather than limiting in nature and many variations and modifications are possible within the scope of the present invention. Such variations and modification may appear obvious and desirable to those skilled in the art based upon the foregoing description of preferred embodiments.

Having thus described the invention by reference to certain of its preferred embodiments, I claim:

1. In a process for regenerating spent molten zinc chloride which has been used in the hydrocracking of coal or ash-containing polynuclear aromatic hydrocarbonaceous materials derived therefrom and which contains zinc chloride, zinc oxide, zinc oxide complexes and ash-containing carbonaceous residue, said process consisting essentially of:
   (a) subjecting said spent molten zinc chloride to vapor phase oxidative treatment by a mixture of air and hydrogen chloride gas in a primary regeneration zone to produce effluent zinc chloride vapors which contain entrained zinc oxide, zinc oxide complexes and residual ash-containing carbonaceous solids;
   (b) separating said zinc chloride vapors from said entrained solids;
   (c) subjecting said separated solids to vapor phase oxidative treatment by a mixture of air and hydrogen chloride gas in a secondary regeneration zone to yield said zinc chloride in vapor form; and
   (d) recovering said zinc chloride in a substantially solids-free molten state,
the improvement comprising; adding a finely-divided clay said clay comprising a reactive aluminum silicate to said primary regeneration zone in an amount sufficient to suppress the vaporization of ash metals other than zinc at primary regeneration conditions.

2. The improvement of claim 1 wherein said clay is added in an amount up to about 25 weight percent based on the weight of said ash.

3. The improvement of claim 2 wherein said clay is selected from the group consisting of kaolin clays.

4. The improvement of claim 1 wherein said clay is added to said secondary regenerator.

5. In a process for regenerating spent molten zinc chloride which has been used in the hydrocracking of coal or ash-containing polynuclear aromatic hydrocarbonaceous materials derived therefrom and which contains zinc chloride, zinc oxide, zinc oxide complexes and ash-containing carbonaceous residue, said process consisting essentially of:
   (a) subjecting said spent molten zinc chloride to vapor phase oxidative treatment by a mixture of air and hydrogen chloride gas in a primary regeneration zone to produce effluent zinc chloride vapors which contain entrained zinc oxide, zinc oxide complexes and residual ash-containing carbonaceous solids;
   (b) separating said zinc chloride vapors from said entrained solids;
   (c) subjecting said separated solids to vapor phase oxidative treatment by a mixture of air and hydrogen chloride gas in a secondary regeneration zone to yield said zinc chloride in vapor form; and
   (d) recovering said zinc chloride in a substantially solids-free molten state,
the improvement comprising; adding a finely-divided clay said clay comprising a reactive aluminum silicate to said secondary regeneration zone in an amount sufficient to suppress the vaporization of ash metals other than zinc at secondary regeneration conditions.

6. The improvement of claim 5 wherein water is charged to said secondary regeneration zone in an amount sufficient to further suppress the vaporization of said ash metals.

7. The improvement of claim 6 wherein said water is added in an amount less than about 10 mol percent of the vapor stream produced in said secondary regeneration zone.

8. The improvement of claim 5 wherein said clay is charged to said primary regeneration zone in an amount sufficient to suppress the vaporization of said ash metals at primary regeneration conditions.

9. The improvement of claim 5 wherein said clay is selected from the group consisting of kaolin clays.

* * * * *

UNITED STATES PATENT OFFICE
CERTIFICATE OF CORRECTION

PATENT NO. : 4,257,914

DATED : March 24, 1981

INVENTOR(S) : Clyde W. Zielke and William A. Rosenhoover

It is certified that error appears in the above-identified patent and that said Letters Patent are hereby corrected as shown below:

Col. 4, line 58, "$C_2$" should read --$Cl_2$--

Col. 5, line reading "% Total Zinc Removed from Feed    92.6" should read --% Total Zinc Removed from Feed    92.06--

Signed and Sealed this

Sixteenth Day of June 1981

[SEAL]

Attest:

RENE D. TEGTMEYER

Attesting Officer    Acting Commissioner of Patents and Trademarks